(12) United States Patent
Song et al.

(10) Patent No.: US 10,180,753 B2
(45) Date of Patent: *Jan. 15, 2019

(54) TOUCHSCREEN PANEL

(71) Applicant: LG DISPLAY CO., LTD., Seoul (KR)

(72) Inventors: Minseob Song, Jeonju-si (KR); Seunghyun Kim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/955,896

(22) Filed: Apr. 18, 2018

(65) Prior Publication Data

US 2018/0239489 A1    Aug. 23, 2018

Related U.S. Application Data

(63) Continuation of application No. 15/332,449, filed on Oct. 24, 2016, now Pat. No. 9,977,534.

(30) Foreign Application Priority Data

Oct. 29, 2015   (KR) .................. 10-2015-0151341

(51) Int. Cl.
   *G09G 3/20*      (2006.01)
   *G06F 3/041*     (2006.01)
   *G06F 3/044*     (2006.01)

(52) U.S. Cl.
   CPC ........... *G06F 3/0416* (2013.01); *G06F 3/044* (2013.01); *G06F 2203/04102* (2013.01); *G06F 2203/04107* (2013.01); *G06F 2203/04111* (2013.01)

(58) Field of Classification Search
   CPC .............. G06F 3/0416; G06F 3/044; G06F 2203/04102; G06F 2203/04107; G06F 3/04111; G06F 3/041; G09G 3/3688; G09G 3/3275; G09G 2300/0426; G09G 2310/0297; G09G 3/2983; G09G 3/3233;
   (Continued)

(56) References Cited

U.S. PATENT DOCUMENTS

2010/0295819 A1 * 11/2010 Ozeki .................... G06F 3/044
                                                    345/174
2011/0316803 A1 * 12/2011 Kim ...................... G06F 3/044
                                                    345/173
(Continued)

*Primary Examiner* — Lun-Yi Lao
*Assistant Examiner* — Jarurat Suteerawongsa
(74) *Attorney, Agent, or Firm* — Dentons US LLP

(57) ABSTRACT

A touchscreen panel includes a base film having a bezel area and a free form active area; first touch electrodes and second touch electrodes crossing each other in the active area; first touch pads and second touch pads in the bezel area, and a guard pad between adjacent first and second touch pads; first routing lines in the bezel area, connecting the first touch electrodes and the second touch pads; second routing lines in the bezel area, connecting the second touch electrodes and the second touch pads; a guard line extending from the guard pads and disposed between adjacent first and second routing lines; and a bridge pattern over an insulating film that covers the first routing lines, second routing lines, and guard line, wherein one or more of the first routing lines and one or more of the first touch electrodes that correspond to each other are attached to the bridge pattern via contact holes penetrating the insulating film and electrically connected together.

7 Claims, 8 Drawing Sheets

(58) Field of Classification Search
CPC ............... G09G 3/3258; G09G 3/3607; G09G 2300/0439; G09G 2300/06; G09G 2300/08; G09G 3/20
See application file for complete search history.

(56) References Cited

U.S. PATENT DOCUMENTS

| | | | |
|---|---|---|---|
| 2013/0271675 A1* | 10/2013 | Misaki | G06F 3/044 349/12 |
| 2014/0232950 A1 | 8/2014 | Park et al. | |
| 2015/0002458 A1 | 1/2015 | Lee et al. | |

* cited by examiner (a)          (b)

TOUCHSCREEN PANEL

This application is a Continuation of application Ser. No. 15/332,449 filed on Oct. 24, 2016 and claims the priority benefit of Korean Patent Application No. 10-2015-0151341 filed on Oct. 29, 2015, which are incorporated herein by reference for all purposes as if fully set forth herein.

BACKGROUND OF THE INVENTION

Field of the Invention

The present invention relates to a touchscreen panel and a display device including the same, and more particularly to a free form touchscreen panel with a novel arrangement of wires.

Discussion of the Related Art

User interfaces (UI) enable humans (users) to interact with various types of electrical and electronic devices and easily control them as they want. Typical examples of user interfaces include keypads, keyboards, mice, on-screen displays (OSD), and remote controllers with an infrared communication capability or radio frequency (RF) communication capability. The user interface technology is continuously developing to improve user sensation and ease of operation. Recently, user interfaces have been evolving into touch UI, voice recognition UI, 3D UI, etc.

The touch UI is becoming increasingly indispensable in portable information appliances, and moreover, it is being extensively used in almost all types of home appliances. A capacitive touch sensing system can be used in a variety of applications, with its touchscreen panel structure that offers higher durability and optical clarity than a traditional resistive touch sensing system and is capable of multi-touch detection and proximity-touch detection.

Flexible displays have also become commercially viable recently. For example, a flexible display reproduces input images in an active area of a display panel where plastic OLEDs (organic light-emitting diodes) are formed. The plastic OLEDs are formed on a flexible plastic substrate. Flexible displays can come in various designs and offers benefits in portability and durability. Flexible displays are adopted in a diverse range of applications including TVs (televisions), car displays, and wearable devices, as well as mobile devices such as smartphones and tablet PCs, by adding a touchscreen panel comprising a plurality of touch sensors.

A display with a touchscreen panel can beneficially have a free form (or unconventional shapes, or odd-shaped), rather than a traditional rectangular design. That is, the active area, where images are displayed, as well as the touchscreen panel and the display panel of the display device, should be a free form.

Since free form displays have a different shape from existing displays, the placement of many structural components of the display should also be different. For example, a free form display may require an arrangement of wires which is different from those of the existing displays.

That is, there is a need for a novel arrangement of wires that enables different wires receiving different signals to be arranged efficiently to avoid interference between the different wires. Moreover, the bezel area, in which these wires are arranged and images are not displayed, is beneficially made as small as possible to achieve a narrow bezel display device.

SUMMARY

Accordingly, the present invention are directed to a touchscreen panel and a display device including the same that substantially obviate one or more problems due to limitations and disadvantages of the related art.

An advantage of the present invention is directed to provide a touchscreen panel which has a narrow bezel while reducing signal interference between adjacent wires.

Additional features and advantages of the present invention will be set forth in the description which follows, and in part will be apparent from the description, or may be learned by practice of the invention. These and other advantages of the present invention will be realized and attained by the structure particularly pointed out in the written description and claims hereof as well as the appended drawings.

To achieve these and other advantages and in accordance with the purpose of embodiments of the invention, as embodied and broadly described herein, a touchscreen panel may, for example, include a base film having a bezel area and a free form active area; first touch electrodes and second touch electrodes crossing each other in the active area; first touch pads and second touch pads in the bezel area, and a guard pad between adjacent first and second touch pads; first routing lines in the bezel area, connecting the first touch electrodes and the second touch pads; second routing lines in the bezel area, connecting the second touch electrodes and the second touch pads; a guard line extending from the guard pads and disposed between adjacent first and second routing lines; and a bridge pattern over an insulating film that covers the first routing lines, second routing lines, and guard line, wherein one or more of the first routing lines and one or more of the first touch electrodes that correspond to each other are attached to the bridge pattern via contact holes penetrating the insulating film and electrically connected together.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention. In describing various embodiments, descriptions of the same or like parts will be made representatively in a first exemplary embodiment, but omitted in other embodiments. The names of the elements used in the following description may be selected for ease of writing the specification, and may be different from the names of parts in actual products.

Although terms including ordinal numbers such as "first" and "second" may be used to describe various components, the components are not limited by the terms. The terms are used only to distinguish one component from other components.

Figure 1:
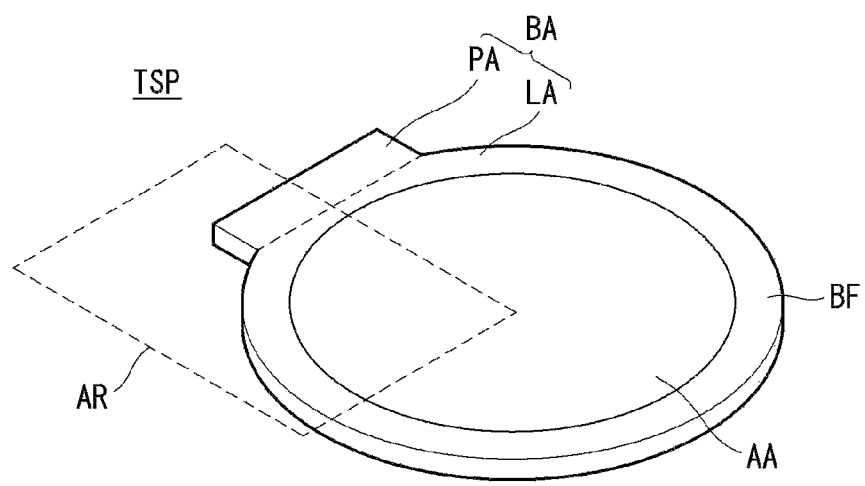
FIG. 1 is a perspective view schematically illustrating a touchscreen panel according to an embodiment of the present invention.

Hereinafter, a touchscreen panel according to an embodiment of the present invention will be described schematically with reference to FIG. 1. FIG. 1 is a perspective view schematically illustrating a touchscreen panel according to an embodiment of the present invention.

An embodiment of the present invention relates to a free form (or unconventional shapes, or odd-shaped) touchscreen panel TSP which has a shape other than a traditional rectangular shape. Specifically, the touchscreen panel according to an embodiment of the present invention comprises a base film BF, and the base film BF comprises a bezel area BA and a free form active area AA.

The shape of the base film BF forming the appearance of the touchscreen panel TSP is not limited. That is, the figure illustrates by way of example that the base film BF is approximately circular but not limited to it. The plane of the base film BF may be made into a variety of shapes, including polygonal, circular, elliptical, etc.

The active area AA is the area where touch sensors are placed, and refers to the area which the user brings a conductor into direct contact with or places it close to, to let them operate the touchscreen panel TSP. The active area AA may correspond to an actual image display area in a display device comprising the touchscreen panel TSP.

The touch sensors comprise mutual capacitance sensors. That is, the touchscreen panel according to an embodiment of the present invention is implemented as a capacitive touchscreen panel that detects touch input by a plurality of capacitive sensors, and has a touch sensor array. The touch sensor array comprises a plurality of touch sensors having mutual capacitance. Mutual capacitance may occur between electrodes intersecting each other.

A touchscreen panel with mutual capacitance sensors according to an embodiment of the present invention may comprise Tx electrodes, Rx electrodes intersecting the Tx electrodes, and mutual capacitance sensors formed at the intersections of the Tx electrodes and the Rx electrodes. Tx lines are driving signal lines that apply a touchscreen panel driving signal to the mutual capacitance sensors and supply electrical charge to the touch sensors. The Rx lines are sensor lines that are connected to the mutual capacitance sensors and supply the electrical charge in the touch sensors to a touch sensing circuit. In mutual capacitance sensing, touch input is detected by applying a driving signal to the Tx electrodes through the Tx lines to supply an electrical charge to the mutual capacitance sensors, and then sensing a change in the capacitance of the mutual capacitance sensors through the Rx lines, in synchronization with the touchscreen panel driving signal. The touch sensing circuit detects a touch of a conductive material like a finger and its position by sensing a change in the capacitance of the touch sensors before and after the touch. That is, when a conductor gets close to mutual capacitance, the amount of charge in the mutual capacitance is reduced, and this enables the detection of touch input, gesture, and posture. The touch sensing circuit may be mounted on a joining portion that is bonded to Tx and Rx pads placed on one side of the touchscreen panel. The joining portion may be, but not limited to, a COF (chip on film). The touch sensing circuit may send and receive a touch signal for driving the touch sensors, in synchronization with a control signal from a main board electrically connected to the joining portion.

The active area AA is a free form, rather than a traditional rectangular design. The planar shape of the active area AA may be the same as or different from the planar shape of the base film BF. For example, a circular active area AA may be defined on a rectangular base film BF. In the following description, the planar shape of the active area AA is circular, by way of example. Touch electrodes are arranged in the active area AA. The touch electrodes comprise first touch electrodes and second touch electrodes. The first touch electrodes are either Tx electrodes or Rx electrodes. The second touch electrodes are the other electrodes.

The bezel area BA refers to the area surrounding the active area AA. The bezel area BA comprises a touch pad portion PA and a routing wiring portion LA. The touch pad portion PA is placed on one side of the base film BF. A plurality of touch pads are arranged on the touch pad portion PA. the touch pads comprise first touch pads and second touch pads. The first touch pads are either Tx electrodes or Rx electrodes. The second touch pads are the other electrodes.

Routing lines connecting the touch sensors and the corresponding touch pads to each other are arranged on the routing wiring portion LA. The routing lines comprise first routing lines and second routing lines. The first routing lines are either Tx lines or Rx lines. The second routing lines are the other routing lines.

Hereinafter, wire arrangement structures will be described through exemplary embodiments of the present invention.

<First Exemplary Embodiment>

Figure 2:
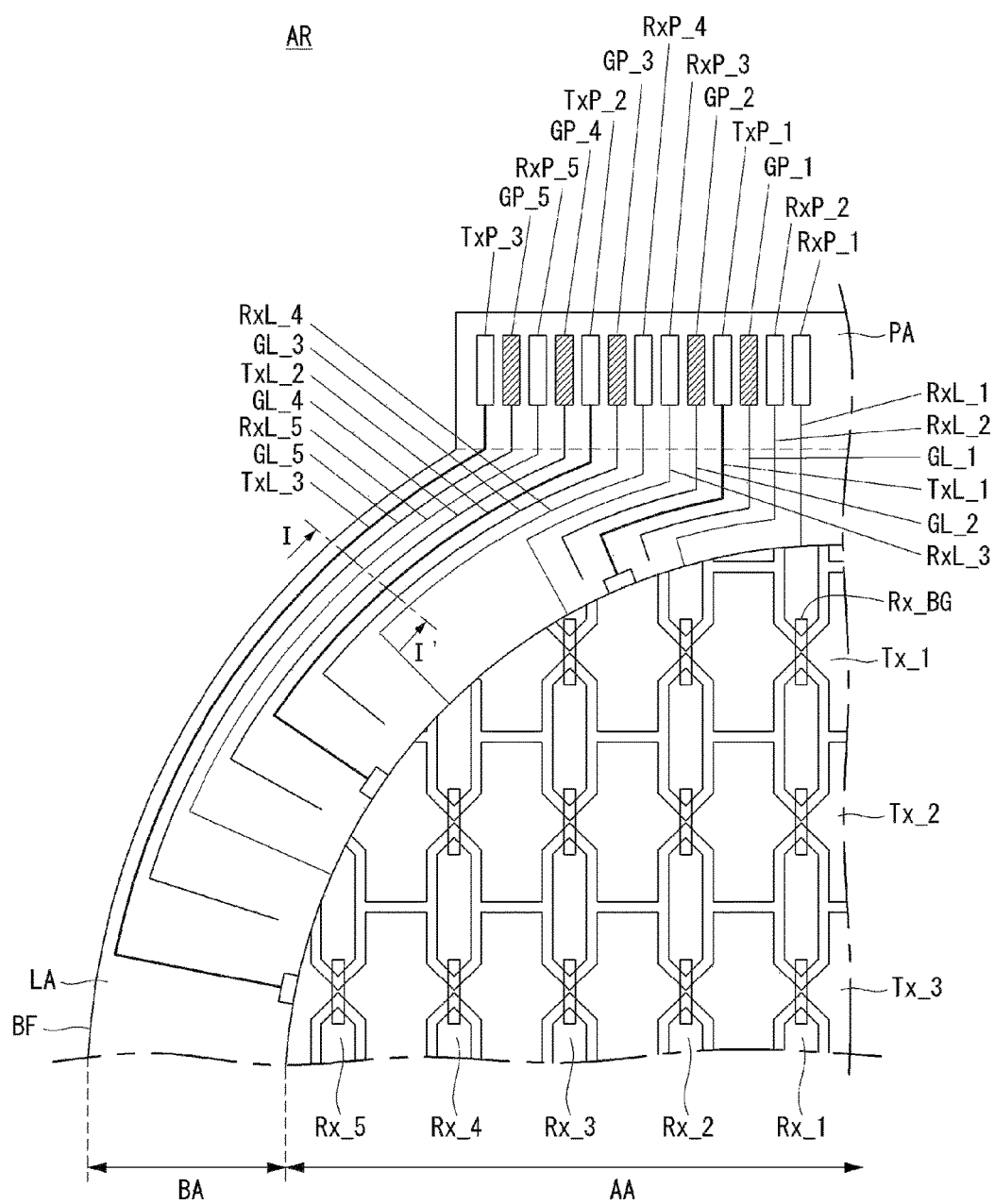
FIG. 2 is an enlarged view of area AR of FIG. 1 illustrating a touchscreen panel according to a first exemplary embodiment of the present invention.
Figure 3:
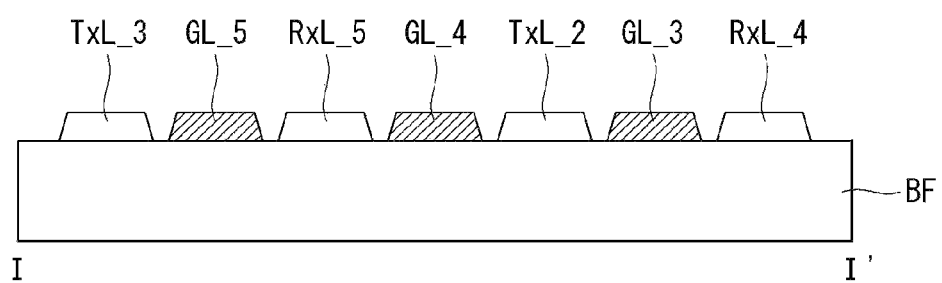
FIG. 3 is a cross-sectional view taken along line IT of FIG. 2.

Referring to FIGS. 2 and 3, a touchscreen panel according to a first exemplary embodiment of the present invention will be described. FIG. 2 is an enlarged view of area AR of FIG. 1 illustrating a touchscreen panel according to a first exemplary embodiment of the present invention. FIG. 3 is a cross-sectional view taken along line I-I' of FIG. 2 schematically illustrating the touchscreen panel according to an embodiment of the present invention.

Referring to FIGS. 2 and 3, the touchscreen panel according to the first exemplary embodiment of the present invention comprises a base film BF. An active area AA and a bezel area BA are defined on the base film BF. The active area AA comprises a plurality of Tx electrodes arranged side by side in a first direction and a plurality of Rx electrodes arranged in a second direction to intersect the Tx electrodes. The shape of the Tx electrodes and Rx electrodes is not limited to what is shown in the figures.

The Tx electrodes and the Rx electrodes are formed on the same layer. Accordingly, either the Tx electrodes or the Rx electrodes are separated from the intersections of the Tx electrodes and the Rx electrodes. In the following description, Rx electrodes are separated from the intersections, by way of example. The separated Rx electrodes are electrically connected through a connecting pattern Rx_BG. That is, an insulating film is interposed between the separated Rx electrodes and the connecting pattern Rx_BG. The connecting pattern Rx_BG is attached to the separated Rx electrodes via contact holes penetrating the insulating film, and electrically connects the separated Rx electrodes.

The bezel area BA comprises a touch pad portion PA and a routing wiring portion LA. The touch pad portion PA is placed on any one side of the bezel area BA. A plurality of Tx pads and a plurality of Rx pads are arranged on the touch pad portion PA. A plurality of Tx lines and a plurality of Rx lines are arranged on the routing wiring portion LA. The Tx lines connect the corresponding Tx electrodes and the corresponding Tx pads together. The Rx lines connect the corresponding Rx electrodes and the corresponding Tx electrodes together. The Tx lines and the Rx lines are formed on the same layer.

For convenience of explanation, the characteristics of an embodiment of the present invention will be described based only on the touch electrodes, routing lines, and touch pads placed in some area AR of the touchscreen panel.

Specifically, a first Tx electrode Tx_1, second Tx electrode Tx_2, and third Tx electrode Tx_3, and a first Rx electrode Rx_1, second Rx electrode Rx_2, third Rx electrode Rx_3, fourth Rx electrode Rx_4, and fifth Rx electrode Rx_5 intersecting the first, second, and third Tx electrodes Tx_1, Tx_2, and Tx_3 are placed in the active area AA. The first Rx electrode Rx_1, second Rx electrode Rx_2, third Rx electrode Rx_3, fourth Rx electrode Rx_4, and fifth Rx electrode Rx_5 are respectively separated from the intersections with the first Tx electrode Tx_1, second Tx electrode Tx_2, and third Tx electrode Tx_3. The separated first Rx electrode Rx_1, second Rx electrode Rx_2, third Rx electrode Rx_3, fourth Rx electrode Rx_4, and fifth Rx electrode Rx_5 are electrically connected through the connecting pattern Rx_BG.

A first Tx pad TxP_1, second Tx pad TxP_2, third Tx pad TxP_3, first Rx pad RxP_1, second Rx pad RxP_2, third Rx pad RxP_3, fourth Rx pad RxP_4, and fifth Rx pad RxP_5 are arranged on the touch pad portion PA.

A first Tx line TxL_1, second Tx line TxL_2, third Tx line TxL_3, first Rx line RxL_1, second Rx line RxL_2, third Rx line RxL_3, fourth Rx line RxL_4, and fifth Rx line RxL_5 are arranged on the routing wiring portion LA The first Tx line TxL_1 connects the first Tx pad TxP_1 and the first Tx electrode Tx_1. The second Tx line TxL_2 connects the second Tx pad TxP_2 and the second Tx electrode Tx_2. The third Tx line TxL_3 connects the third Tx pad TxP_3 and the third Tx electrode Tx_3.

The first Rx line RxL_1 connects the first Rx pad RxP_1 and the first Rx electrode Tx_1. The second Rx line RxL_2 connects the second Rx pad RxP_2 and the second Rx electrode Tx_2. The third Rx line RxL_3 connects the third Rx pad RxP_3 and the third Rx electrode Tx_3. The fourth Rx line RxL_4 connects the fourth Rx pad RxP_4 and the fourth Rx electrode Tx_4. The fifth Rx line RxL_5 connects the fifth Rx pad RxP_5 and the fifth Rx electrode Tx_5. Accordingly, a Tx channel connecting the Tx pads, Tx lines, and Tx electrodes and an Rx channel connecting the Rx pads, Rx lines, and Rx electrodes are formed.

In order to minimize the bezel area BA, the Tx pads TxP_1, TxP_2, and TxP_3 and the Rx pads RxP_1, RxP_2, and RxP_3 should be arranged in such a way that they occupy the smallest area possible and the pitch between adjacent touch pads is the shortest possible. It should be noted that the area of the Tx pads TxP_1, TxP_2, and TxP_3 and the Rx pads RxP_1, RxP_2, and RxP_3 and the pitch between them are determined by taking into account poor contact, process deviation, etc. due to misalignment.

Also, in order to minimize the bezel area BA, the Tx lines TxL_1, TxL_2, and TxL_3 and the Rx lines RxL_1, RxL_2, and RxL_3 should be arranged in such a way that their line width and spacing are the shortest possible. It should be noted that the line width and thickness of the Tx lines TxL_1, TxL_2, and TxL_3 and the Rx lines RxL_1, RxL_2, and RxL_3 are determined by taking resistance, etc. into account.

To avoid short-circuit, the Tx lines and the Rx lines are arranged in such a way that they do not intersect each other. In an example, the Tx lines and the Rx lines may be sequentially arranged relative to the distance between a joining portion and the touch pad portion PA. The joining portion refers to the area where corresponding Tx electrodes and Tx lines are in direct contact with each other and corresponding Rx electrodes and Rx lines are in direct contact with each other. The position of the joining portion may be changed by other factors such as the convenience of the process, etc.

Channels—from the channel where the distance between the joining portion and the touch pad portion PA is the shortest to the channel where this distance is the longest—may be sequentially formed relative to the distance between the joining portion and the touch pad portion PA. Accordingly, the first Rx pad RxP_1, second Rx pad RxP_2, first Tx pad TxP_1, third Rx pad RxP_3, fourth Rx pad RxP_4, second Tx pad TxP_2, fifth Rx pad RxP_5, and third Tx pad TxP_3 may be sequentially arranged on the touch pad portion PA. Corresponding to the touch pads, the first Rx line RxL_1, second Rx line RxL_2, first Tx line TxL_1, third Rx line RxL_3, fourth Rx line RxL_4, second Tx line TxL_2, fifth Rx line RxL_5, and third Tx line TxL_3 may be sequentially arranged on the routing wiring portion LA.

In the case where a Tx line and an Rx line are placed adjacent to each other, parasitic capacitance between them causes a high-frequency signal applied to the Tx channel to affect the Rx channel, thereby increasing the noise in the Rx channel.

Moreover, when static electricity is applied to the routing lines, the insulating film between the adjacent Tx and Rx lines will melt and this will lead to dielectric breakdown, resulting in a short-circuit in the adjacent Tx line and Rx line. Also, a large amount of electrical current enters the touch sensing circuit through the adjacent Tx and Rx lines, which may cause damage to the circuit.

To address the above-mentioned problems, the touchscreen panel according to the first exemplary embodiment of the present invention further comprises guard pads GP and guard lines GL. Each guard pad GP is placed between adjacent Tx and Rx pads.

The guard lines GL extend from the guard pads GP, and each of them is placed between a Tx line and an Rx line. It is desirable that the end of each guard line GL is not connected to any electrode or line. Each guard pad GL and each guard line GP are electrically connected to form a guard channel The guard channel is connected to a ground voltage source and receive a ground voltage.

Specifically, the guard pads GP are placed on the touch pad portion PA. A first guard pad GP_1 is placed between the second Rx pad RxP_2 and the first Tx pad TxP_1. A second guard pad GP_2 is placed between the first Tx pad TxP_1 and the third Rx pad RxP_3. A third guard pad GP_3 is placed between the fourth Rx pad RxP_4 and the second Tx pad TxP_2. A fourth guard pad GP_4 is placed between the second Tx pad TxP_2 and the fifth Rx pad RxP_5. A fifth guard pad GP_5 is placed between the fifth Rx pad RxP_5 and the third Tx pad TxP_3.

The guard lines GL extending from the guard pads GP are placed on the routing wiring portion LA. A first guard line GL_1 is placed between the second Rx line RxL_2 and the first Tx line TxL_1. A second guard line GL_2 is placed between the first Tx line TxL_1 and the third Rx line RxL_3. A third guard line GL3 is placed between the fourth Rx line RxL_4 and the second Tx line TxL_2. A fourth guard line GL_4 is placed between the second Tx line TxL_2 and the fifth Rx line RxL_5. A fifth guard line GL_5 is placed between the fifth Rx line RxL_5 and the third Tx line TxL_3.

By placing the guard lines GL connected to the ground voltage source between the Tx lines and the Rx lines, the parasitic capacitance between the Tx lines and the Rx lines can be reduced or minimized, which can also reduce noise from Rx signals. Moreover, a static electricity applied to the Tx lines and the Rx lines can be discharged to the ground voltage source through the guard lines GL, thereby protecting the Tx and Rx lines or the touch sensing circuit from static electricity.

The first exemplary embodiment of the present invention provides a touchscreen panel which can reduce signal interference between adjacent Tx and Rx lines and prevent problems from static electricity.

Meanwhile, the touchscreen panel according to the first exemplary embodiment of the present invention has an increase in the size of the bezel area BA due to an increase in the number of guard pads and the number of guard lines. Such an increase in bezel size may degrade aesthetic features of a display device having the touchscreen panel.

<Second Exemplary Embodiment>

A touchscreen panel according to a second exemplary embodiment of the present invention relates to a touchscreen panel with a free form active area AA, which is characterized by a novel arrangement of routing lines that can reduce signal interference between Tx lines and Rx lines and achieve a narrow bezel.

The touchscreen panel according to the second exemplary embodiment of the present invention comprises a guard pad and a guard line. The guard pad is placed between adjacent Tx and Rx pads. The guard line extends from the guard pad, and is placed between a Tx line and an Rx line. In this way, by placing the guard line connected to the ground voltage source between the Tx lines and the Rx lines, the parasitic capacitance between the Tx lines and the Rx lines can be minimized, which can reduce noise from Rx signals. Moreover, any static electricity applied to the Tx lines and the Rx lines can be discharged to the ground voltage source through the guard line, thereby protecting the Tx and Rx lines or the touch sensing circuit from static electricity.

Moreover, in the second exemplary embodiment of the present invention, the routing lines may be divided into a Tx group consisting of a plurality of Tx lines and an Rx group consisting of a plurality of Rx lines, in order to reduce the number of guard pads and the number of guard lines. Also, a plurality of Tx groups and Rx groups may be provided. A guard line is placed between adjacent Tx and Rx groups.

Either the Tx group and the Rx group may be placed adjacent to the active area. Assuming that the Rx group is placed adjacent to the active area, it may be necessary that at least one Tx line in the Tx group intersects the Rx lines in the Rx group, in order to be connected to the corresponding Tx electrode. To prevent short-circuit caused by the intersection of the Tx lines and the Rx lines formed on the same layer, the second exemplary embodiment of the present invention comprises a bridge pattern for electrically connecting the Tx lines and the Tx electrodes. The bridge pattern is placed over an insulating film that covers the Tx lines and the Rx lines. The bridge pattern is attached to the Tx lines and the Tx electrodes via contact holes penetrating the insulating film, and electrically connects them. In this case, the bridge pattern intersects the Rx lines and the guard line, with the insulating film in between.

In this way, in the second exemplary embodiment of the present invention, a plurality of Tx lines and a plurality of Rx lines are grouped into separate groups and placed separately. The second exemplary embodiment of the present invention can reduce the number of guard lines, compared to the first exemplary embodiment, just by placing a guard line between the Rx group and the Tx group to prevent signal interference. Accordingly, the second exemplary embodiment of the present invention provides a touchscreen panel with a narrow bezel since the number of guard lines and the number of guard pads connected to the guard lines can be reduced.

Most preferably, the Tx group may comprise all the Tx lines, and the Rx group may comprise all the Rx lines, and only one guard line may be placed between the Tx group and the Rx group. That is, the bezel area may comprise a first bezel area and a second bezel area. Either the Tx group or the Rx group is arranged in the first bezel area, and the other one is arranged in the second bezel area. The guard line is placed between the first bezel area and the second bezel area to separate the two areas. In this case, one guard line and one guard pad can suffice to prevent signal interference between adjacent Tx and Rx lines. Accordingly, the second exemplary embodiment of the present invention provides a touchscreen panel with a narrow bezel since the width of the bezel area is narrower compared to the first exemplary embodiment.

Figure 4:
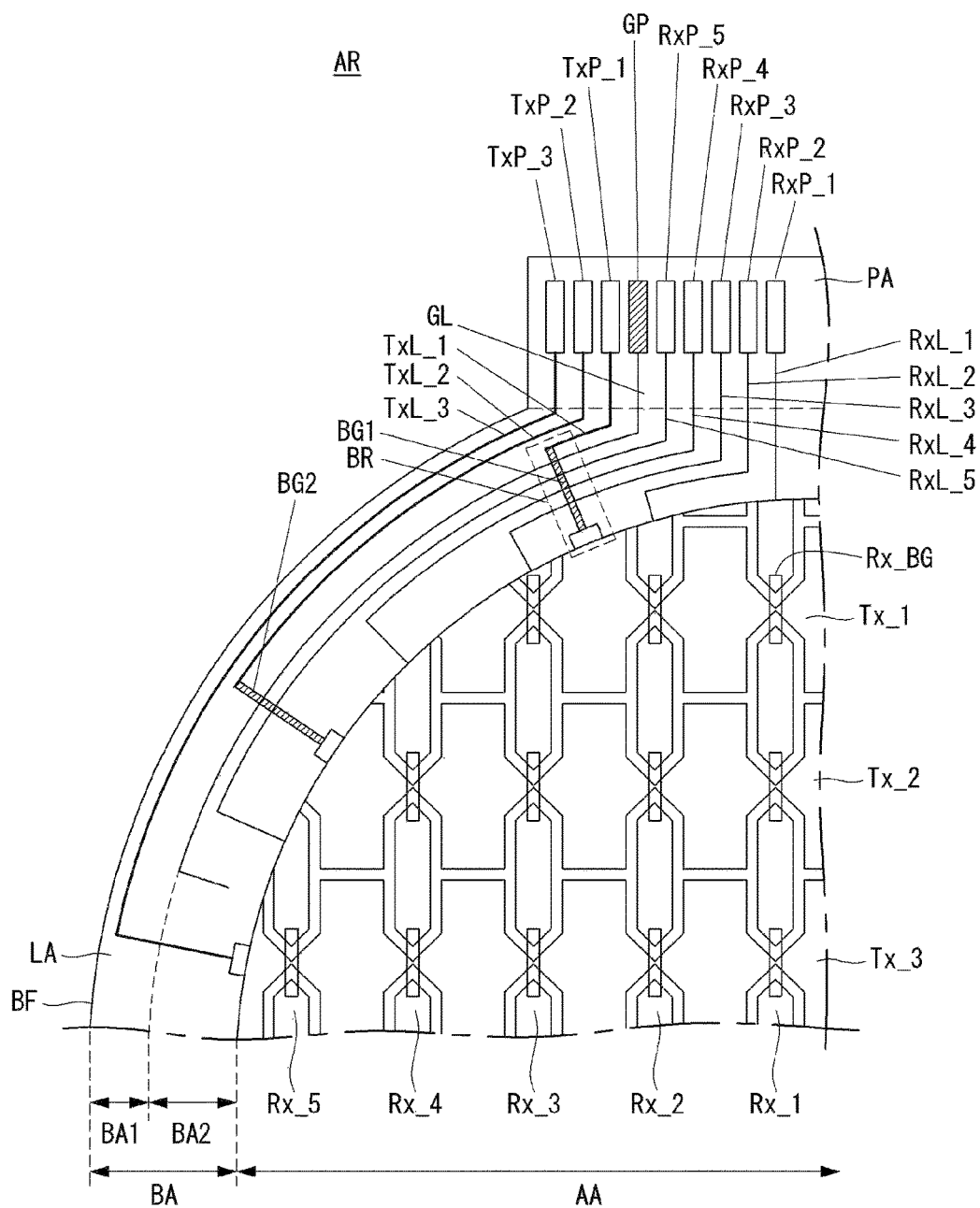
FIG. 4 is an enlarged view of area AR of FIG. 1 illustrating a touchscreen panel according to a second exemplary embodiment of the present invention.
Figure 5:
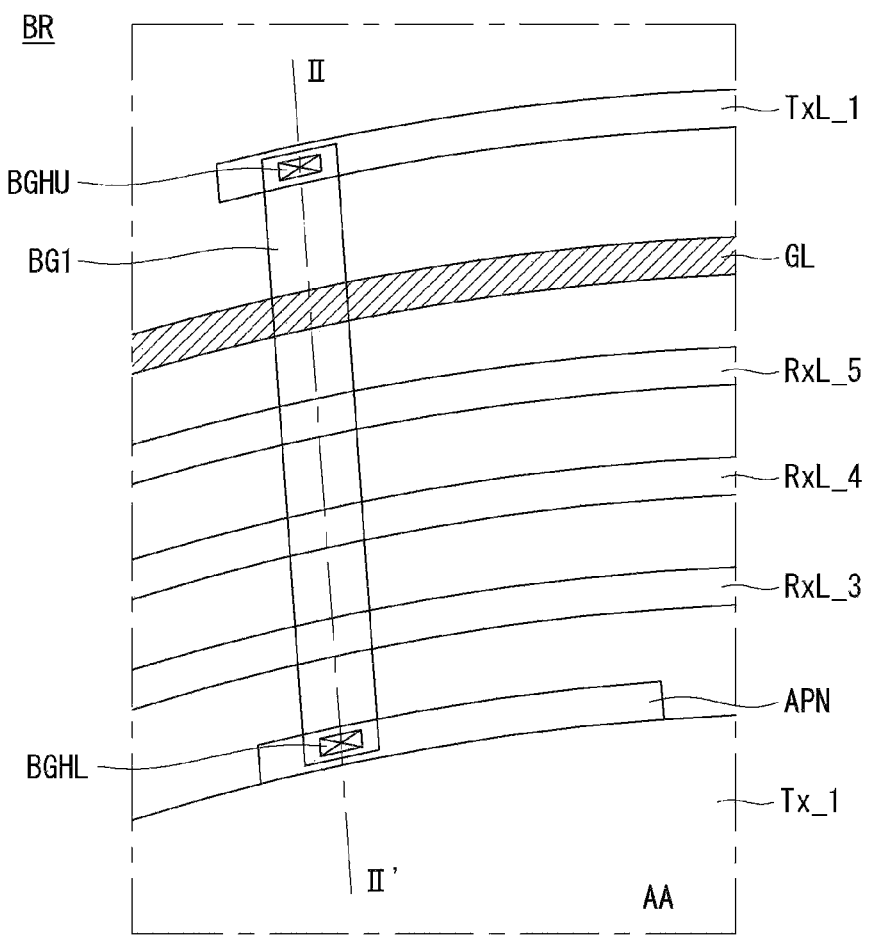
FIG. 5 is an enlarged view of area BR of FIG. 4.
Figure 6:
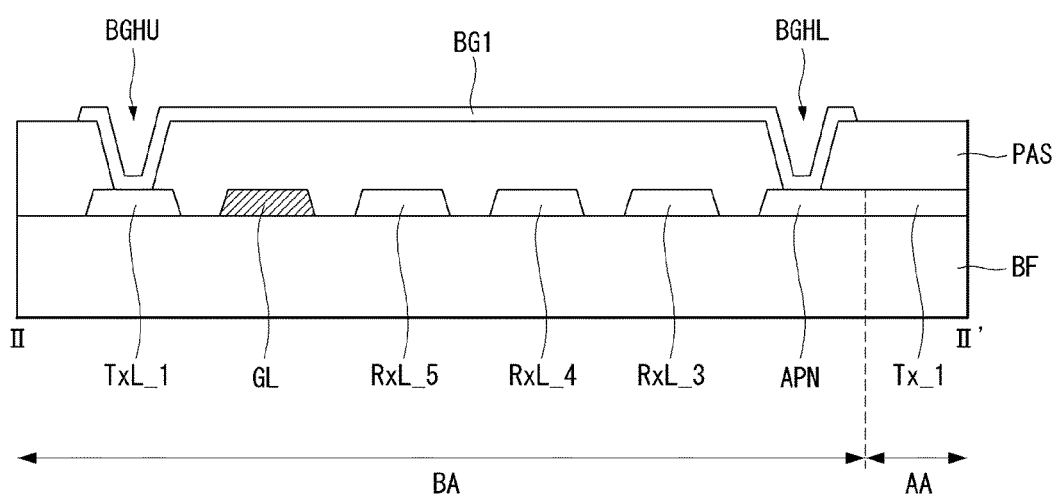
FIG. 6 is a cross-sectional view taken along line II-II' of FIG. 5.

Referring to FIGS. 4 to 6, the most preferable exemplary embodiment will be described below. FIG. 4 is an enlarged view of area AR of FIG. 1 illustrating a touchscreen panel according to a second exemplary embodiment of the present invention. FIG. 5 is an enlarged view of area BR of FIG. 4. FIG. 6 is a cross-sectional view taken along line II-II' of FIG. 5.

Referring to FIG. 4, the touchscreen panel according to the second exemplary embodiment of the present invention comprises a base film BF. An active area AA and a bezel area BA are defined on the base film BF. The active area AA comprises a plurality of Tx electrodes arranged side by side in a first direction and a plurality of Rx electrodes arranged in a second direction to intersect the Tx electrodes. The shape of the Tx electrodes and Rx electrodes is not limited to what is shown in the figures.

Either the Tx electrodes or the Rx electrodes are separated from the intersections of the Tx electrodes and the Rx electrodes. In the following description, Rx electrodes are separated from the intersections, by way of example. The separated Rx electrodes are electrically connected through a connecting pattern Rx_BG. That is, the connecting pattern Rx_BG is placed opposite the separated Rx electrodes, with an insulating film in between them. The connecting pattern Rx_BG is attached to the separated Rx electrodes via contact holes penetrating the insulating film, and electrically connects the separated Rx electrodes.

The bezel area BA comprises a touch pad portion PA and a routing wiring portion LA. The touch pad portion PA is placed on any one side of the bezel area BA. A plurality of Tx pads and a plurality of Rx pads are arranged on the touch pad portion PA. A plurality of Tx lines and a plurality of Rx lines are arranged on the routing wiring portion LA. The Tx lines connect the corresponding Tx electrodes and the corresponding Tx pads together. The Rx lines connect the corresponding Rx electrodes and the corresponding Tx electrodes together.

For convenience of explanation, the characteristics of an embodiment of the present invention will be described based only on the touch electrodes, routing lines, and touch pads placed in some area AR of the touchscreen panel.

Specifically, a first Tx electrode Tx_1, second Tx electrode Tx_2, and third Tx electrode Tx_3 and a first Rx electrode Rx_1, second Rx electrode Rx_2, third Rx electrode Rx_3, fourth Rx electrode Rx_4, and fifth Rx electrode Rx_5 intersecting the first, second, and third Tx electrodes Tx_1, Tx_2, and Tx_3 are placed in the active area AA. The first Rx electrode Rx_1, second Rx electrode Rx_2, third Rx electrode Rx_3, fourth Rx electrode Rx_4, and fifth Rx electrode Rx_5 are respectively separated from the intersections with the first Tx electrode Tx_1, second Tx electrode Tx_2, and third Tx electrode Tx_3. The separated first Rx electrode Rx_1, second Rx electrode Rx_2, third Rx electrode Rx_3, fourth Rx electrode Rx_4, and fifth Rx electrode Rx_5 are electrically connected through the connecting pattern Rx_BG.

A first Tx pad TxP_1, second Tx pad TxP_2, third Tx pad TxP_3, first Rx pad RxP_1, second Rx pad RxP_2, third Rx pad RxP_3, fourth Rx pad RxP_4, and fifth Rx pad RxP_5 are arranged on the touch pad portion PA.

A first Tx line TxL_1, second Tx line TxL_2, third Tx line TxL_3, first Rx line RxL_1, second Rx line RxL_2, third Rx line RxL_3, fourth Rx line RxL_4, and fifth Rx line RxL_5 are arranged on the routing wiring portion LA The first Tx line TxL_1 connects the first Tx pad TxP_1 and the first Tx electrode Tx_1. The second Tx line TxL_2 connects the second Tx pad TxP_2 and the second Tx electrode Tx_2. The third Tx line TxL_3 connects the third Tx pad TxP_3 and the third Tx electrode Tx_3.

The first Rx line RxL_1 connects the first Rx pad RxP_1 and the first Rx electrode Tx_1. The second Rx line RxL_2 connects the second Rx pad RxP_2 and the second Rx electrode Tx_2. The third Rx line RxL_3 connects the third Rx pad RxP_3 and the third Rx electrode Tx_3. The fourth Rx line RxL_4 connects the fourth Rx pad RxP_4 and the fourth Rx electrode Tx_4. The fifth Rx line RxL_5 connects the fifth Rx pad RxP_5 and the fifth Rx electrode Tx_5. Accordingly, a Tx channel connecting the Tx pads, Tx lines, and Tx electrodes and an Rx channel connecting the Rx pads, Rx lines, and Rx electrodes are formed.

In order to minimize the bezel area BA, the Tx pads TxP_1, TxP_2, and TxP_3 and the Rx pads RxP_1, RxP_2, and RxP_3 should be arranged in such a way that they occupy the smallest area possible and the pitch between adjacent touch pads is the shortest possible. It should be noted that the area of the Tx pads TxP_1, TxP_2, and TxP_3 and the Rx pads RxP_1, RxP_2, and RxP_3 and the pitch between them are determined by taking into account poor contact, process deviation, etc. due to misalignment.

Also, in order to minimize the bezel area BA, the Tx lines TxL_1, TxL_2, and TxL_3 and the Rx lines RxL_1, RxL_2, and RxL_3 should be arranged in such a way that their line width and spacing are the shortest possible. It should be noted that the line width and thickness of the Tx lines TxL_1, TxL_2, and TxL_3 and the Rx lines RxL_1, RxL_2, and RxL_3 are determined by taking resistance, etc. into account.

The bezel area BA comprises a first bezel area BA1 and a second bezel area BA2. The second bezel area BA2 is placed adjacent to the active area AA. Either the Tx group or the Rx group is placed in the first bezel area BA1. The other group is placed in the second bezel area BA2. The Tx group comprises a first Tx line TxL_1, a second Tx line TxL_2, and a third Tx line TxL_3. The Rx group comprises a first Rx line RxL_1, a second Rx line RxL_2, and a third Rx line RxL_3. In the following description, the Tx group is arranged in the first bezel area BA1, and the Rx group is arranged in the second bezel area BA, by way of example.

The first Rx line RxL_1, second Rx line RxL_2, third Rx line RxL_3, fourth Rx line RxL_4, fifth Rx line RxL_5, first Tx line TxL_1, second Tx line TxL_2, and third Tx line TxL_3 are sequentially arranged on the touch pad portion PA. Corresponding to the Rx and Tx lines, the first Rx pad RxP_1, second Rx pad RxP_2, third Rx pad RxP_3, fourth Rx pad RxP_4, fifth Rx pad RxP_5, first Tx pad TxP_1, second Tx pad TxP_2, and third Tx pad TxP_3 are sequentially arranged on the touch pad portion PA.

A guard line GL is arranged between the Tx group and the Rx group. That is, a guard line GL is arranged between the fifth Rx line RxL_5 and the first Tx line TxL_1 which are adjacent to each other. Corresponding to the guard line GL, a guard pad GP is arranged between the fifth Rx pad RxP_5 and the first Tx pad TxP_1 which are adjacent to each other.

The first Rx line RxL_1 connects the first Rx pad RxP_1 and the first Rx electrode Rx_1. The second Rx line RxL_2 connects the second Rx pad RxP_2 and the second Rx electrode Rx_2. The third Rx line RxL_3 connects the third Rx pad RxP_3 and the third Rx electrode Rx_3. The fourth Rx line RxL_4 connects the fourth Rx pad RxP_4 and the fourth Rx electrode Rx_4. The fifth Rx line RxL_5 connects the fifth Rx pad RxP_5 and the fifth Rx electrode Rx_5.

The first Tx line TxL_1 extends from the first Tx pad TxP_1, and is connected to the first Tx electrode Tx_1 through a first bridge pattern BG1. The second Tx line TxL_2 extends from the second Tx pad TxP_2, and is connected to the second Tx electrode Tx_2 through a second bridge pattern BG2. The third Tx line TxL_3 extends from the third Tx pad TxP_3, and is connected to the third Tx electrode Tx_3 through a third bridge pattern BG3.

Referring further to FIGS. 5 and 6, the bridge pattern BG1 is placed over an insulating film PAS that covers the Tx line TxL_1, the Rx lines RxL_3, RxL_4, and RxL_5, and the guard line GL, and is connected to the Tx line TxL_1 and the Tx electrode Tx _1 via contact holes GBHL and BGHU.

An auxiliary pattern APN may be further formed at the joining portion of the Tx line TxL_1 and the Tx electrode Tx_1. The auxiliary pattern APN is placed in the bezel area BA, and extends from the Tx electrode Tx_1 and is electrically connected to the Tx electrode Tx_1. To electrically connect the bridge pattern BG1 and the Tx electrode Tx_1, the contact hole BGHL may be formed in the insulating film PAS in a way that exposes part of the auxiliary pattern APN. In this case, the bridge pattern BG1 may be electrically connected to the Tx electrode Tx_1 by making direct contact with the auxiliary pattern APN.

In the second exemplary embodiment of the present invention, by placing the guard line GL connected to the ground voltage source between the Tx group and the Rx group, the parasitic capacitance between adjacent Tx and Rx lines can be minimized This can reduce noise from Rx signals. Moreover, a static electricity applied to the Tx lines and the Rx lines can be discharged to the ground voltage source through the guard line GL, thereby protecting the Tx and Rx lines or the touch sensing circuit from static electricity. Moreover, the second exemplary embodiment of the present invention provides a touchscreen panel with a narrow bezel since the number of guard pads and the number of guard lines can be reduced.

Figure 7:
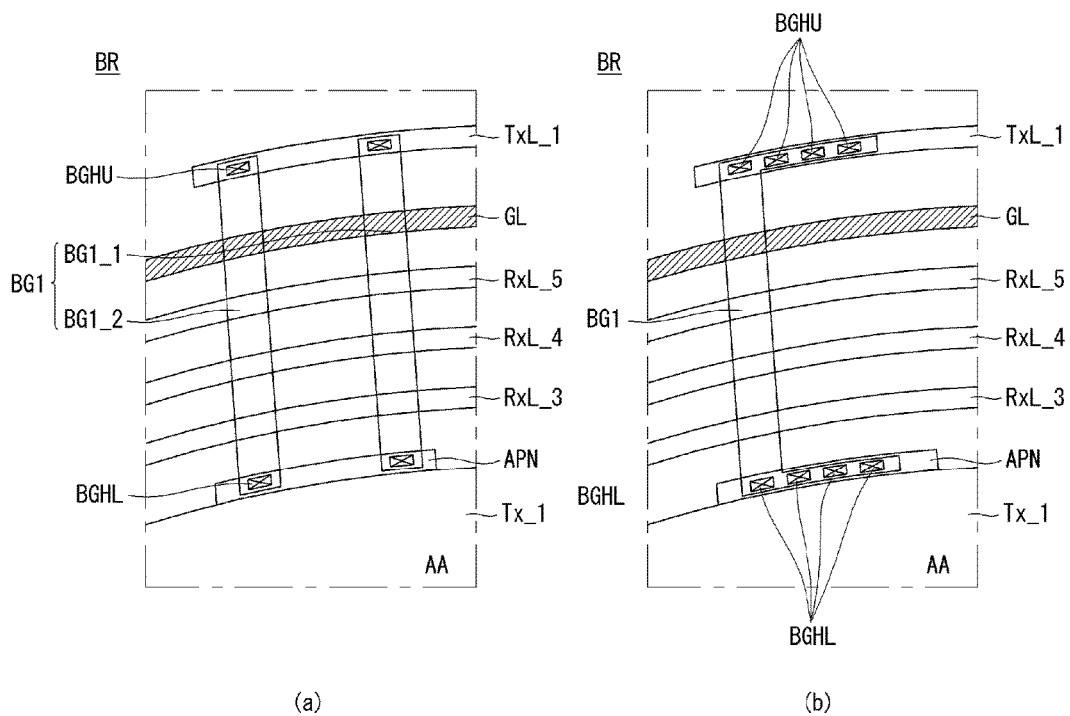
FIG. 7 is an enlarged view of area BR of FIG. 4 according to a modified example of the present invention.
Figure 8:
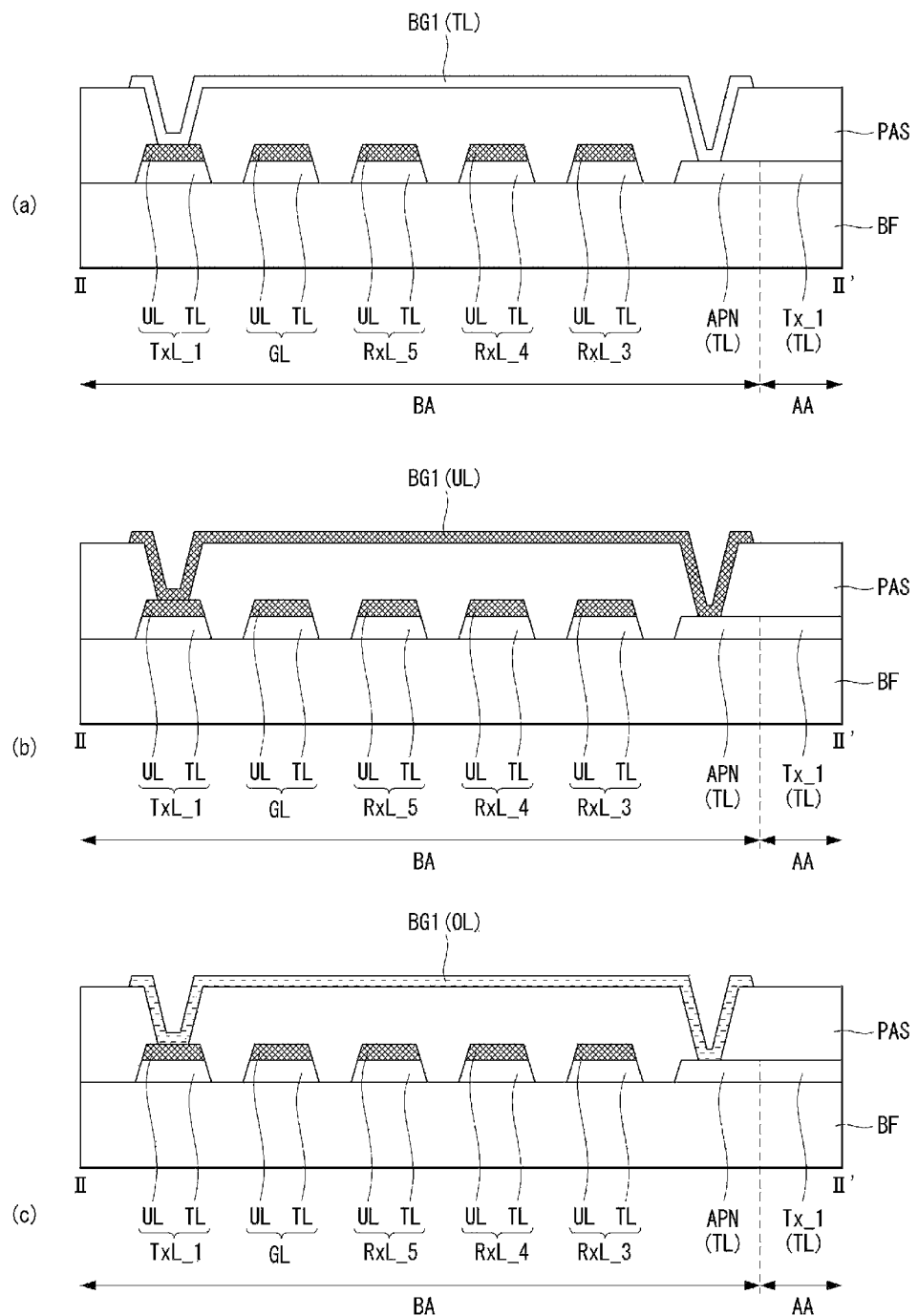
FIG. 8 is a cross-sectional view taken along line II-II' of FIG. 5 according to a modified example of the present invention.

Referring further to FIGS. 7 and 8, a touchscreen panel according to a modified example of the present invention will be described below. FIG. 7 is an enlarged view of area BR of FIG. 4 illustrating a touchscreen panel according to a modified example of the present invention. FIG. 8 is a cross-sectional view taken along line II-II' of FIG. 5 according to a modified example of the present invention.

Referring to FIG. 7, the bridge pattern BG1 is placed over an insulating film that covers the Tx line TxL_1, the Rx lines RxL_3, RxL_4, and RxL_5, and the guard line GL, and is connected to the Tx line TxL_1 and the Tx electrode Tx_1 via contact holes BGHL and BGHU. In this case, a plurality of bridge patterns BG1 may be formed to electrically connect the Tx line TxL_1 and the Tx electrode Tx_1. For example, as illustrated in the figure, the bridge pattern BG1 may comprise a first bridge pattern BG1_1 and a second bridge pattern BG1_2. In this way, the touchscreen panel according to an embodiment of the present invention allows the other bridge pattern to function as a compensating pattern even if any of these bridge patterns is open-circuited, by forming a plurality of bridge patterns to connect a Tx line and the corresponding Tx electrode ((a) of FIG. 7).

Either a plurality of first contact holes BGHU or a plurality of second contact holes BGHL, or both may be formed to electrically connect the bridge pattern BG1 and the Tx electrode Tx_1. In this way, the touchscreen panel according to the present invention allows the other contact hole to function as a compensating pattern even if poor contact occurs to any of these contact holes, by forming a plurality of contact holes to connect a Tx line and the corresponding Tx electrode ((b) of FIG. 7).

Referring to FIG. 8, the Tx line TxL_1, the Rx lines RxL_3, RxL_4, and RxL_5, and guard line GL may be made of a two-layer stack of a transparent conductive material TL and a non-transparent conductive material UL. The transparent conductive material TL may be ITO (indium tin oxide), and the non-transparent conductive material UL may be the same material as the Tx electrode Tx_1. The non-transparent conductive material UL may be any one of the following materials: Al, AlNd, Mo, MoTi, Cu, and Cr. the Tx line TxL_1, the Rx lines RxL_3, RxL_4, and RxL_5, and guard line GL may be made of a single layer. In this case, the Tx line TxL_1, the Rx lines RxL_3, RxL_4, and RxL_5, and guard line GL may be made of a low-resistance, non-transparent conductive material.

The bridge pattern BG1 may be made using the same process from the same material as the transparent conductive material TL constituting the Tx line TxL_1, the Rx lines RxL_3, RxL_4, and RxL_5, and guard line GL ((a) of FIG. 8). The bridge pattern BG1 may be made from the same material as the non-transparent conductive material UL constituting the Tx line TxL_1, the Rx lines RxL_3, RxL_4, and RxL_5, and guard line GL ((b) of FIG. 8). Also, the bridge pattern BG1 may be made from a conductive material OL different from the conductive material constituting the Tx line TxL_1, the Rx lines RxL_3, RxL_4, and RxL_5, and guard line GL ((a) of FIG. 8).

Although not shown, the bridge pattern BG1 may be made using the same process from the same material as the connecting pattern Rx_BG (shown in FIG. 4) that is placed in the active area AA.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen panel comprising;
a base film having a bezel area and a free form active area;
first touch electrodes and second touch electrodes in the active area;
first touch pads and second touch pads in the bezel area, and a guard pad between adjacent first and second touch pads;
first routing lines in the bezel area, connecting the first touch electrodes and the first touch pads;
second routing lines in the bezel area, connecting the second touch electrodes and the second touch pads;
a guard line extending from the guard pads and disposed between adjacent first and second routing lines; and
a bridge pattern disposed over at least one second routing line, wherein the bridge pattern electrically connects at least one first touch electrode to at least one first routing line;
wherein the bridge pattern and at least one second routing line are spaced apart from each other with at least one insulating film interposed therebetween.

2. The touch screen panel of claim 1, wherein the guard line is connected to a ground voltage source.

3. The touch screen panel of claim 1, wherein the bridge pattern disposed over at least one guard line.

4. The touch screen panel of claim 1, further comprising an auxiliary pattern placed in the bezel area,
wherein the auxiliary pattern is extending from the first touch electrodes and is in direct contact with the bridge pattern.

5. The touch screen panel of claim 1, wherein one end of the bridge pattern is connected to at least one first routing line via at least one first contact hole penetrating the insulating film, and wherein another end of the bridge pattern is connected to at least one first touch electrode via at least one second contact hole penetrating the insulating film.

6. The touch screen panel of claim 1, wherein the bezel area comprises a first bezel area where the first routing lines are placed and a second bezel area where the second routing lines are placed,
wherein the guard line is placed between the first bezel area and the second bezel area.

7. The touch screen panel of claim 1, wherein the first routing lines, the second routing lines and the guard line are a multilayer in which a transparent conductive material and a non-transparent conductive material are laminated, and
wherein the first and second touch electrodes are a single layer made of the transparent conductive material.

* * * * *